(12) United States Patent
Schumacher et al.

(10) Patent No.: US 11,718,146 B2
(45) Date of Patent: Aug. 8, 2023

(54) VEHICLE MICROCLIMATE SYSTEM AND METHOD OF CONTROLLING SAME

(71) Applicant: Gentherm Incorporated, Northville, MI (US)

(72) Inventors: Darren Andrew Schumacher, Ann Arbor, MI (US); Paul Cameron Giberson, Tecumseh (CA); Gregory Leo Steinl, Ann Arbor, MI (US); Wayne Swoyer Kauffman, III, Oak Park, MI (US); Vincenzo Sebastiano, Tecumseh (CA)

(73) Assignee: Gentherm Incorporated, Northville, MI (US)

( * ) Notice: Subject to any disclaimer, the term of this patent is extended or adjusted under 35 U.S.C. 154(b) by 67 days.

(21) Appl. No.: 17/327,842

(22) Filed: May 24, 2021

(65) Prior Publication Data
US 2021/0276393 A1    Sep. 9, 2021

Related U.S. Application Data

(63) Continuation of application No. 15/523,209, filed as application No. PCT/US2015/058321 on Oct. 30, 2015, now Pat. No. 11,014,424.
(Continued)

(51) Int. Cl.
*B60H 1/00* (2006.01)
*B60N 2/56* (2006.01)
*B62D 1/06* (2006.01)

(52) U.S. Cl.
CPC ....... *B60H 1/00285* (2013.01); *B60H 1/0075* (2013.01); *B60H 1/00292* (2013.01);
(Continued)

(58) Field of Classification Search
CPC ............ B60H 1/00285; B60H 1/00292; B60H 1/00742; B60H 1/0075; B60H 1/00764;
(Continued)

(56) References Cited

U.S. PATENT DOCUMENTS

| 4,024,725 A | 5/1977 | Uchida et al. |
| 4,920,759 A | 5/1990 | Tanaka et al. |
| (Continued) | | |

FOREIGN PATENT DOCUMENTS

| CN | 101844548 A | 9/2010 |
| CN | 102963235 A | 3/2013 |
| (Continued) | | |

OTHER PUBLICATIONS

Japanese Office Action for Japanese Application No. 2017-523225 dated Jan. 19, 2021.
(Continued)

*Primary Examiner* — Tho V Duong
*Assistant Examiner* — Raheena R Malik
(74) *Attorney, Agent, or Firm* — Carlson, Gaskey & Olds, P.C.

(57) ABSTRACT

A HVAC thermal conditioning system provides a macroclimate environment. An auxiliary thermal conditioning system has multiple microclimate devices. The microclimate devices are configured to be arranged within an interior space that provides the macroclimate environment to an occupant. The microclimate devices provide a microclimate environment to the occupant different than the macroclimate environment. The microclimate devices are in close proximity to a region of the occupant. A controller calculates an occupant personal comfort based upon a thermal energy experienced by the occupant from thermal radiation sources, thermal convection sources, and thermal conduction sources, and to automatically command the microclimate
(Continued)

devices in response to the calculated occupant personal comfort based upon occupant characteristics to achieve a desired occupant personal comfort. The automatic command is to adjust and apportion the thermal conduction sources and/or thermal radiation sources experienced by the occupant to achieve the desired occupant personal comfort.

21 Claims, 6 Drawing Sheets

Related U.S. Application Data

(60) Provisional application No. 62/073,589, filed on Oct. 31, 2014.

(52) U.S. Cl.
CPC ..... *B60H 1/00742* (2013.01); *B60H 1/00764* (2013.01); *B60H 1/00771* (2013.01); *B60H 1/00892* (2013.01); *B60N 2/56* (2013.01); *B62D 1/065* (2013.01)

(58) Field of Classification Search
CPC .. B60H 1/00771; B60H 1/00892; B60N 2/56; B62D 1/065
USPC ......................................................... 165/204
See application file for complete search history.

(56) References Cited

U.S. PATENT DOCUMENTS

| | | | |
|---|---|---|---|
| 5,172,856 A | 12/1992 | Tanaka et al. | |
| 5,291,748 A | 3/1994 | Ueda | |
| 5,400,963 A | 3/1995 | Ishikawa et al. | |
| 5,449,275 A | 9/1995 | Gluszek et al. | |
| 5,518,065 A | 5/1996 | Asou et al. | |
| 5,518,176 A | 5/1996 | Turner et al. | |
| 5,524,439 A | 6/1996 | Gallup et al. | |
| 5,603,226 A * | 2/1997 | Ishikawa | B60H 1/00892 62/182 |
| 5,878,809 A | 3/1999 | Heinle | |
| 6,079,485 A | 6/2000 | Esaki et al. | |
| 6,079,781 A | 6/2000 | Tilley | |
| 6,237,675 B1 | 5/2001 | Oehring et al. | |
| 6,711,470 B1 | 3/2004 | Hartenstein et al. | |
| 6,727,467 B1 | 4/2004 | Hadzizukic et al. | |
| 6,857,697 B2 | 2/2005 | Brennan et al. | |
| 6,892,808 B2 * | 5/2005 | Remond | B60H 1/0073 165/203 |
| 7,111,468 B2 | 9/2006 | Choi et al. | |
| 7,188,668 B2 | 3/2007 | Hara et al. | |
| 7,260,950 B2 | 8/2007 | Choi et al. | |
| 7,533,535 B2 | 5/2009 | Kadle et al. | |
| 7,647,780 B2 | 1/2010 | Aoki et al. | |
| 7,918,100 B2 | 4/2011 | Breed et al. | |
| 8,176,741 B2 | 5/2012 | Kameyama | |
| 8,180,493 B1 | 5/2012 | Laskow | |
| 8,655,415 B2 | 2/2014 | Yokota | |
| 8,839,632 B2 | 9/2014 | Goenka et al. | |
| 2004/0201481 A1 | 10/2004 | Yoshinori et al. | |
| 2008/0003938 A1 | 1/2008 | Baruschke et al. | |
| 2009/0286459 A1 | 11/2009 | Major et al. | |
| 2009/0301116 A1 * | 12/2009 | Nathan | B60L 8/003 62/208 |
| 2010/0130808 A1 | 5/2010 | Hattori | |
| 2011/0240751 A1 | 10/2011 | Rauh et al. | |
| 2011/0272131 A1 | 11/2011 | Mikat | |
| 2013/0061603 A1 | 3/2013 | Li | |
| 2013/0232996 A1 * | 9/2013 | Goenka | B60H 1/00742 62/3.61 |
| 2013/0255930 A1 | 10/2013 | Prakah-Asante et al. | |
| 2014/0090513 A1 | 4/2014 | Zhang et al. | |

FOREIGN PATENT DOCUMENTS

| | | |
|---|---|---|
| CN | 103868188 A | 6/2014 |
| DE | 10326649 A1 | 12/2004 |
| DE | 102005042830 A1 | 3/2007 |
| EP | 1468851 A1 | 10/2004 |
| EP | 1468851 B1 | 8/2005 |
| EP | 2008865 A1 | 12/2008 |
| FR | 2917854 A1 | 12/2008 |
| FR | 2917855 A1 | 12/2008 |
| GB | 1232048 A | 5/1971 |
| GB | 2324864 A | 11/1998 |
| GB | 2344647 A | 6/2000 |
| JP | S5595054 | 7/1980 |
| JP | S5737642 | 3/1982 |
| JP | S6027904 | 2/1985 |
| JP | S6092919 | 5/1985 |
| JP | S62125243 | 6/1987 |
| JP | S62299420 | 12/1987 |
| JP | H01229713 | 9/1989 |
| JP | H02120117 A | 1/1990 |
| JP | H02136321 | 5/1990 |
| JP | H05124429 A | 5/1993 |
| JP | H07186690 A | 7/1995 |
| JP | H10278541 A | 10/1998 |
| JP | 2001273715 A | 10/2001 |
| JP | 2005278434 A | 10/2005 |
| JP | 2005306075 A | 11/2005 |
| JP | 2006199058 A | 8/2006 |
| JP | 2008273498 A | 11/2008 |
| WO | 2014014862 A2 | 1/2014 |

OTHER PUBLICATIONS

The International Search Report and Written Opinion for PCT Application No. PCT/US2015/058321, dated Jan. 1, 2016.
Provisional Application Filed for U.S. Appl. No. 61/900,334, filed Nov. 5, 2013.
Provisional Application Filed for U.S. Appl. No. 62/039,125, filed Aug. 19, 2014.
Chinese Decision of Rejection for Chinese Application No. 201580064568.2 dated May 9, 2020.
Japanese Office Action for Japanese Application No. 2017-523225 dated Nov. 26, 2019.
Korean Rejection for Korean Patent Application No. 10-2017-7014336 dated Jul. 6, 2018, pp. 2.
German Office Action for German Application No. 112015004914.2 dated Nov. 5, 2018.
Japanese Office Action for Japanese Application No. 2017-523225 dated Jul. 24, 2018.
Chinese Office Action for Chinese Application No. 201580064568.2 dated Nov. 16, 2018.
Article—Development of S-FLOW System & Control. Koichi Tabei Published Apr. 8, 2013. Downloaded from SAE International Mar. 23, 2018. pp. 1-9.

* cited by examiner

VEHICLE MICROCLIMATE SYSTEM AND METHOD OF CONTROLLING SAME

CROSS-REFERENCE TO RELATED APPLICATIONS

This application is a continuation of U.S. patent application Ser. No. 15/523,209, which was filed on Apr. 28, 2017, which is a National Phase of International Application No. PCT/US2015/058321, which was filed on Oct. 30, 2015, which claims priority to U.S. Provisional Application No. 62/073,589, which was filed on Oct. 31, 2014 and is incorporated herein by reference.

BACKGROUND

This disclosure relates to temperature control of a vehicle interior environment, such as within an automobile. More specifically, the disclosure relates to a vehicle microclimate system and a method for controlling the same for increasing an occupant's personal comfort.

Heating, ventilation and cooling (HVAC) systems are widely used in the automobile industry to control the temperature within the vehicle to increase occupant comfort. Increasingly, vehicles have incorporated additional, auxiliary thermal conditioning devices, such as heated and cooled seats and heated steering wheels. These auxiliary thermal conditioning devices are intended to further enhance occupant comfort.

The operation of the HVAC system and auxiliary thermal conditioning devices has not been coordinated. Each device within the vehicle is typically controlled independently based upon inputs from the occupant, such as by actuating switches and dials. Additionally, there has been no thermal conditioning system that addresses individual perception of thermal comfort, referred to herein as "occupant personal comfort," which can vary dramatically between different occupants. Moreover, even when an occupant stops adjusting inputs because the occupant believes thermal comfort finally has been achieved, changing thermal loads on the vehicle may upset occupant thermal comfort, requiring more inputs from the occupant.

SUMMARY

In one exemplary embodiment, a vehicle microclimate system includes a HVAC thermal conditioning system that is configured to provide a macroclimate environment. The vehicle microclimate system further includes an auxiliary thermal conditioning system that has multiple microclimate devices. The microclimate devices are configured to be arranged within an interior space that provides the macroclimate environment to an occupant. The microclimate devices are configured to provide a microclimate environment to the occupant different than the macroclimate environment. The microclimate devices are configured to be in close proximity to a region of the occupant. The vehicle microclimate system further includes a controller that is in communication with the microclimate devices. The controller is configured to calculate an occupant personal comfort based upon a thermal energy experienced by the occupant from thermal radiation sources, thermal convection sources, and thermal conduction sources. The controller is configured to automatically command the microclimate devices in response to the calculated occupant personal comfort based upon occupant characteristics to achieve a desired occupant personal comfort. The automatic command from the controller is configured to control at least one of multiple microclimate devices to adjust and apportion the thermal conduction sources and/or thermal radiation sources experienced by the occupant to achieve the desired occupant personal comfort.

In a further embodiment of any of the above, a region of the occupant includes at least one of a hand, a foot, a neck, a face, a leg, an arm, a head and a torso. The at least one of multiple microclimate devices is provided by at least one of a steering wheel, a seat, a door panel, an armrest, a dash panel and a roof panel.

In a further embodiment of any of the above, the occupant characteristics uses at least one of measured occupant information, user-input occupant information and learned occupant information.

In a further embodiment of any of the above, the microclimate vehicle system includes an occupant comfort sensor in communication with the controller. The occupant comfort sensor is configured to detect the occupant characteristics. The controller is configured to use the detected occupant characteristics for determining the occupant personal comfort.

In a further embodiment of any of the above, the occupant characteristics include at least one of occupant core temperature, occupant skin temperature and occupant skin moisture.

In a further embodiment of any of the above, the occupant comfort sensor is an IR sensor that is configured to detect the occupant skin temperature.

In a further embodiment of any of the above, the occupant comfort sensor is at least one of a weight sensor and a seatbelt sensor.

In a further embodiment of any of the above, the user-input occupant information corresponds to a user-input occupant profile that includes at least one of gender, height, weight and occupant-provided comfort data.

In a further embodiment of any of the above, the user-input occupant profile is stored on at least one of a key fob and a mobile device.

In a further embodiment of any of the above, the user-input occupant profile is configured to move with the occupant via a vehicle data link, a cloud, a wireless transmission and/or a smartphone for use with another vehicle.

In a further embodiment of any of the above, the memory includes at least one look-up table with a microclimate profile that is associated with the occupant. The controller is configured to modify the microclimate profile based upon at least one user input and command the microclimate devices in response to the microclimate profile associated with the user profile.

In a further embodiment of any of the above, the controller records a thermal control setting for at least one of an outside temperature, an inside temperature, and a humidity on the look-up table and stores the thermal control settings chosen by the occupant under the recorded conditions.

In a further embodiment of any of the above, the thermal control settings include user inputs to at least one of a switch and a touchscreen used to control at least one of the HVAC thermal conditioning system and the microclimate devices.

In a further embodiment of any of the above, the thermal control settings are adjusted based upon how long the system is left in a particular state without the occupant adjusting the thermal control settings.

In a further embodiment of any of the above, the look-up table is configured to move with the occupant via a vehicle data link, a cloud, a wireless transmission and/or a smartphone for use with another vehicle.

In a further embodiment of any of the above, the occupant characteristics are associated with a microclimate profiles for use in setting the microclimate system at the occupant's specific location within the vehicle.

In a further embodiment of any of the above, the occupant personal comfort is calculated based upon an equation $TE_{occ}=\Sigma q_r+\Sigma q_{cv}+\Sigma q_{cd}$, wherein $TE_{occ}$ is the thermal energy experienced by the occupant, $q_r$ corresponds to the thermal radiation sources, $q_{cv}$ corresponds to the thermal convection sources, and $q_{cd}$ corresponds to the thermal conduction sources. The automatic command from the controller is configured to adjust $\Sigma q_{cd}$ and/or $\Sigma q_r$ by controlling at least one of multiple microclimate devices to achieve the desired thermal comfort according to the equation.

In a further embodiment of any of the above, the controller is configured to detect a solar load on the vehicle relating to the thermal radiation sources $q_r$ based upon a solar load parameter. At least one of the microclimates device is commanded in response the solar load parameter. The controller is configured to determine the solar load based upon at least one of vehicle location, vehicle direction of travel, detected light intensity and sun location.

In a further embodiment of any of the above, the thermal convection source is thermally conditioned airflow from a vent.

In a further embodiment of any of the above, the thermal conduction source is heating or cooling from a seat surface.

In a further embodiment of any of the above, the occupant personal comfort is determined for each of multiple vehicle occupants.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
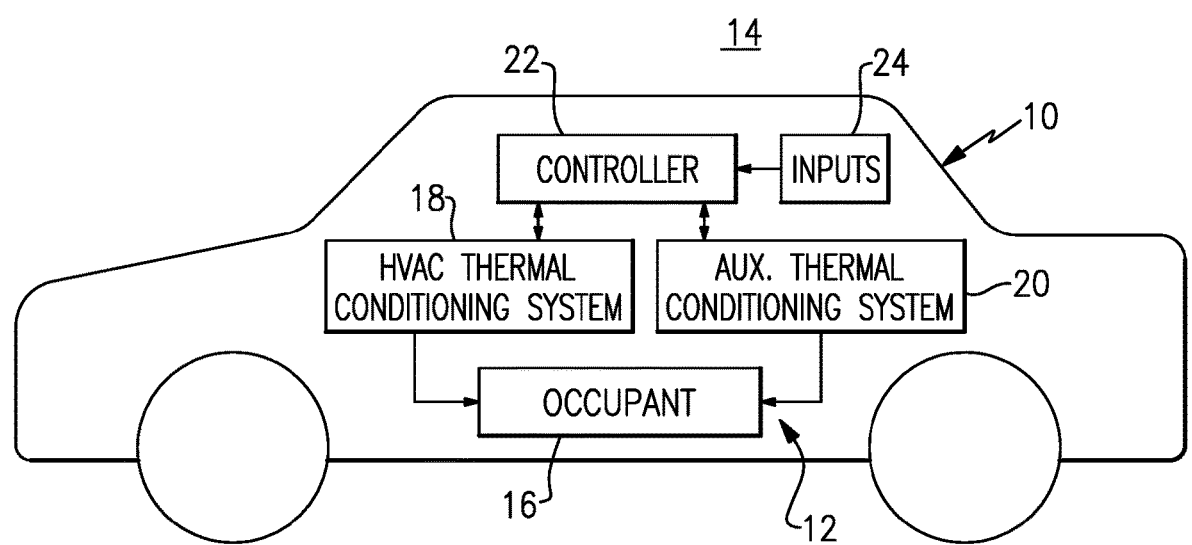
FIG. 1 is a schematic view of a vehicle having a microclimate system.

A vehicle 10, such as an automobile, is schematically shown in FIG. 1. The vehicle 10 includes a cabin or an interior space 12 for one or more occupants 16 that provides a vehicle interior environment in which the occupant experiences thermal comfort. The vehicle 10 is arranged in a vehicle exterior environment 14, which also can affect the thermal comfort of the interior space 12, introducing a thermal energy imbalance in the vehicle's interior space.

Each occupant typically has a unique occupant personal comfort. That is, a particular occupant detects a level of thermal energy differently than another occupant. As a result, the exact same thermal environment within a vehicle may be perceived as comfortable by one occupant, but as uncomfortable by another occupant. To this end, this disclosure relates to providing an integrated approach to human thermal management by controlling and coordinating both macroclimate devices (e.g., central HVAC system) and microclimate devices (e.g., climate controlled seats (e.g., U.S. Pat. Nos. 5,524,439 and 6,857,697), head rest/neck conditioner (e.g., U.S. Provisional App. No. 62/039,125), climate controlled headliner (e.g., U.S. Provisional App. No. 61/900,334), steering wheel (e.g., U.S. Pat. No. 6,727,467 and U.S. Pub. No. 2014/0090513), heated gear shifter (e.g., U.S. Pub. No. 2013/0061603, etc.) to achieve a personalized microclimate system. The microclimate system provides desired occupant personal comfort in a more automated manner with little or no input from the occupant. It should be understood that microclimate devices alone (i.e. without a macroclimate device) can provide both a macroclimate and a personalized microclimate within the macroclimate. The referenced patents, publications and applications are incorporated herein by reference in their entirety.

In one example, the vehicle 10 includes an HVAC thermal conditioning system 18 and an auxiliary thermal conditioning system 20 (with microclimate devices), which are in communication with a controller 22. Various inputs 24 may communicate with the controller 22 to affect and control operation of the HVAC thermal conditioning system 18 and/or the auxiliary thermal conditioning system 20.

Figure 2:
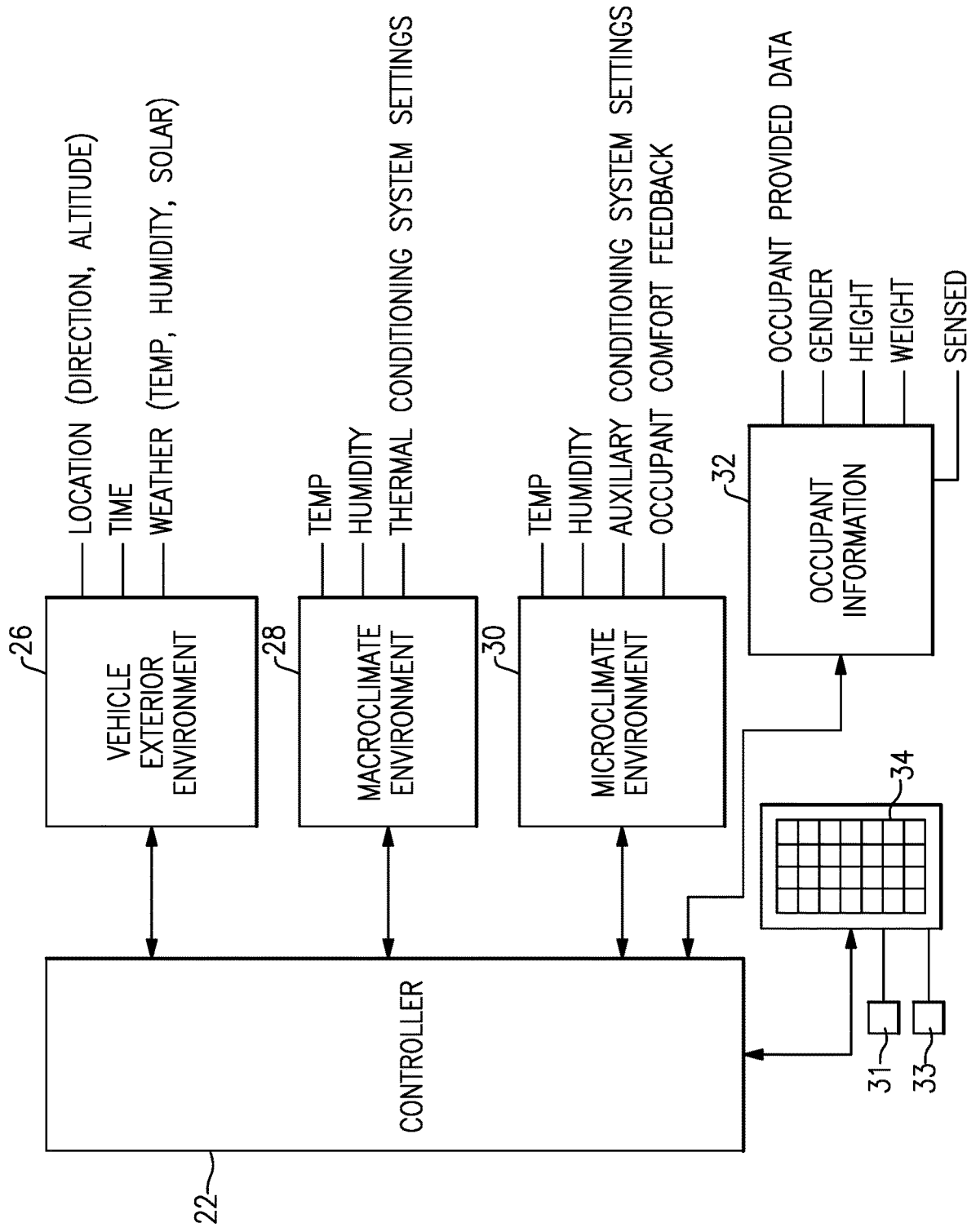
FIG. 2 is a schematic view of a controller of the microclimate system and example inputs provided to the controller for the vehicle of FIG. 1.

In one example microclimate system, the controller 22 receives various inputs via sensors and/or devices within the microclimate system, for example, from a vehicle exterior environment 26 shown in FIG. 2. The vehicle exterior environment 26 may include parameters such as vehicle location, vehicle direction and altitude, time of day and date, and weather related parameters (outdoor temperature, outdoor humidity, and solar load on the vehicle).

A macroclimate environment 28 also communicates parameters to the controller 22. The macroclimate environment parameters may include interior temperature and/or humidity at one or more locations, and current HVAC system settings.

A microclimate environment 30 communicates parameters to the controller 22. The microclimate environment parameters may include temperature and/or humidity at one or more microclimate devices, auxiliary conditioning system settings, and occupant comfort feedback. Occupant comfort feedback may be provided when the occupant provides an input to control one of the microclimate devices, such as by changing the position of a switch.

Occupant information 32 is provided to the controller 22 for customizing and accounting for thermoreceptive differences between various occupants. It has been shown, for example, that women and men, generally speaking, react to heat and cold differently, with women reacting more severely and more quickly to cold and men reacting more quickly to heat. Additionally, the occupant information 32 can provide information for determining a thermal mass, heat capacity, and internal energy production rate. Occupant information 32 includes such information as gender, height, weight, and other occupant-provided data to provide a user profile. Then, for example, an initial default data set, or microclimate profile, could be defined during the customer vehicle purchase process, prior to any data being collected. Then based on the default microclimate profile the system can begin the process of intuitively collecting data and then adjusting to individual's needs/wants based on the actual inputs by and use from the user over time. This initial microclimate profile could be based on any number of factors, including quantitative factors such as initial purchase location, driver characteristics (sex, height, weight, etc.), as well as qualitative factors, such as a survey where the respondent answers questions about their normal state of thermal comfort/stress. This information can be stored on a key fob or mobile device that is communicated to the controller 22. The user profile and learned microclimate profile can "move" with the occupant via the vehicle data link, the cloud, wireless transmission and/or smartphone, for example.

Sensed occupant information may also be provided (see, e.g., sensor 79 in FIG. 3), for example, by detecting occupant temperature. These sensed occupant personal comfort inputs are provided to the controller 22 for determining a perceived occupant personal comfort. The inputs can include one or more measured physiological parameters such as skin or other body temperatures such as a body core temperature.

Multiple parameters from the vehicle exterior environment 26, the macroclimate environment 28, the microclimate environment 30, and the occupant information 32 may be stored in memory, such as one or more look-up tables 34. The memory may store information relating to one or more user profiles 31 and microclimate profiles 33 for various use scenarios corresponding to a particular user. The controller 22 may learn from adjustments to the microclimate system made by the occupant and update the microclimate profile 33 in the look-up tables 34 so that the occupant personal comfort may be anticipated and the microclimate system adjusted automatically. Interpolation of look-up table values or another suitable method can be used to determine settings between pre-existing set-points.

Figure 3:
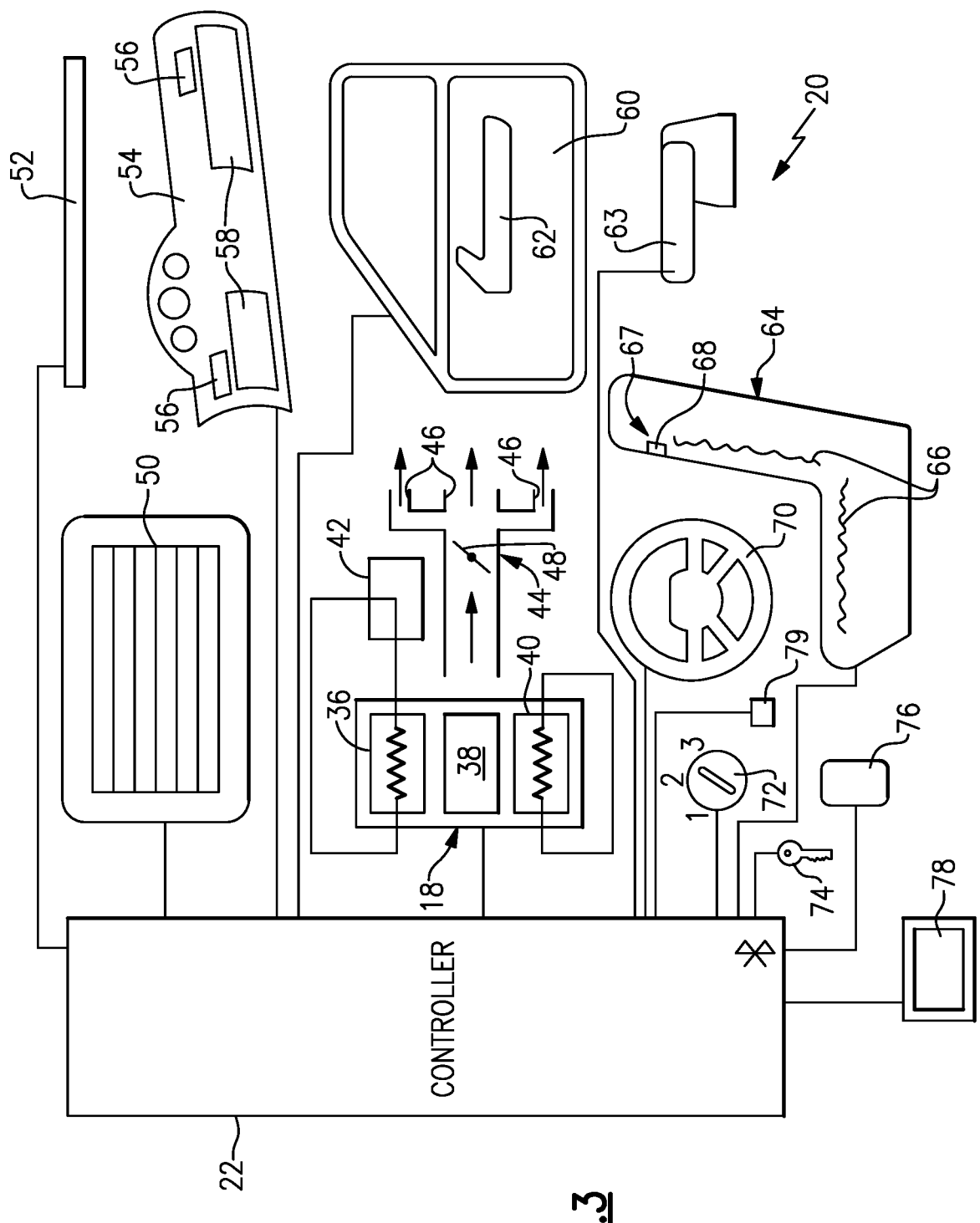
FIG. 3 is a schematic view of the controller in communication with macroclimate devices and microclimate devices for the vehicle of FIG. 1.

Referring in FIG. 3, an example HVAC thermal conditioning system 18 is in communication with the controller 22. The HVAC thermal conditioning system 18 includes a heat exchanger 36 in fluid communication with a heating loop connected to an engine 42. The engine 42 may include an internal combustion engine, an electric motor system, and/or a fuel cell. The engine 42 provides a heat source for the HVAC thermal conditioning system 18. An evaporator 40 is arranged in a cooling loop, which may include refrigerant and conventional air conditioning components typically found in a vehicle. It should be understood that a conventional HVAC system can instead be provided by one or more electrically operated microcompressors, if desired. A ventilation system 38, which provides fresh air to the HVAC system, may also be provided. The HVAC thermal conditioning system 18 typically includes ducting 44 providing multiple vents 46. One or more valves 48 selectively control airflow from the HVAC system to the vents 46. These HVAC system components provide the macroclimate environment.

The auxiliary thermal conditioning system 20 includes multiple microclimate devices, such as a window defroster/defogger 50, a roof panel 52, one or more panels 58 in an instrument panel 54 (which may include vents 56), a door panel 60, a door arm rest 62, a center console armrest 63, a seat 64 having thermal element 66 and a neck conditioning device 67 having a vent 68, and/or a steering wheel 70.

These microclimate devices are intended to increase occupant comfort beyond what an HVAC system is capable by providing heating and/or cooling in close proximity to an occupant and thereby a more personalized microclimate environment within the surrounding interior environment. Heating and cooling can be provided by, for example, one or more heating elements, fans, thermoelectric devices, heat pumps, and/or microcompressors.

The inputs 24 are used to adjust the macroclimate environment and the microclimate environment through the controller 22 to achieve a desired occupant personal comfort. Inputs 24 include sensor signals and other inputs indicative of various parameters of the vehicle exterior environment 26, the macroclimate environment 28, and the microclimate environment 30. Inputs 24 further include one or more switches 72, a key fob 74 containing occupant information, a mobile device 76 containing occupant information and/or a display 78. The display 78 may visually display outputs or operating modes of the HVAC thermal conditioning system 18 and/or the auxiliary thermal conditioning system 20. The display 74 may also provide a means of input via a touchscreen, for example. A sensor 79 may provide real-time, sensed occupant information, such as temperature, moisture, humidity or other information.

Generally, the vehicle microclimate system includes at least one microclimate device configured to be arranged within the interior space of the vehicle. The interior space 12 provides a microclimate environment to the occupant 16. The microclimate device is configured to provide a microclimate environment to the occupant 16 according to the user profile 31 and the microclimate profile 33. In one example mode of operation, the microclimate device is configured to be in close proximity to a region of the occupant having an increased personal response compared to other occupant regions exposed to the macroclimate environment. These occupant regions may include at least one of a hand, a foot, a neck, a face, a leg, an arm, a head, and a torso.

The controller 22 is in communication with the microclimate device. The controller is configured to determine an occupant personal comfort, for example, based upon the occupant information 30. The controller 22 commands the microclimate device in response to the occupant personal comfort to provide increased occupant comfort beyond what the HVAC system can provide, thereby fine-tuning the occupant's immediately surrounding environment. For example, a thermal energy input may unbalance the macroclimate environment, such as the sun shining intensely on the occupant's face for a prolonged period, which might cause the occupant's back to sweat. Anticipating this undesired condition, the controller 22 commands the seat to cool and thereby dehumidify the occupant's back, neck, and/or arms with the thermal elements 66 and/or neck conditioning device. Cooling the back can inhibit and/or remediate sweating in the back area and the associated discomfort such sweating can cause. Cooling one or both arms can lower skin temperature and counteract effects of the solar load on areas most exposed. In the foregoing manners, the auxiliary thermal conditioning system 20 can maintain a comfortable state by inhibiting and/or remediating sweating, which can be an additional source of discomfort.

The HVAC system is largely used to change the equilibrium point of the cabin environment, while the auxiliary thermal comfort system 20 manages the perception of comfort by the occupant. This may enable a reduction in HVAC system size since the thermal comfort of the occupant can be more directly manipulated by more targeted, localized devices. Furthermore, the effort of the two systems can be coordinated to limit the need for the occupant to intervene to change the control settings during operation. For example, when getting in a hot car, the air conditioning almost always begins at full power, leveling off to a lower value once the desired state is achieved. This could be managed quite easily without driver input.

The microclimate system and its controller can be designed using one or more methodologies. For example, an "open loop" methodology may be used wherein a particular model is implemented in a computing platform, which may or may not be in the vehicle. This model is then utilized to determine how occupant thermal comfort should be manipulated. The model may be populated using data from off-line testing and validation, and then the appropriate control effects would be created based on sensor input (e.g., humidity, external temperature, etc.).

A "closed loop" methodology may be used wherein a system (e.g., with an infrared camera being a part of the safety system as well as a humidity sensor) ascertains the condition of an occupant, such as a driver, and adjusts thermal conditions based on this information. For example, image processing techniques could determine that the driver is wearing a hat or that the driver is overheated due to exercise based on infrared (IR) imaging.

A "learning" methodology may be used where the closed loop or open loop methodology is modified over time based on the choices made by a particular occupant or set of occupants to adjust the microclimate profile 33. For example, a vehicle may record the outside temperature, inside temperature, and humidity on the look-up tables 34, and remember the thermal control settings chosen by the driver in these conditions, which could then be replicated (or interpolated) then next time that similar conditions are encountered. The longer that the driver uses the vehicle, the more information that is available, and the more "customized" the microclimate profile for the microclimate system will be to that particular individual. Furthermore, an excellent metric for the suitability of any set of parameters given a particular set of conditions would likely be how long the system is left in a particular state, that is, without an occupant adjusting any thermal settings.

Figure 4:
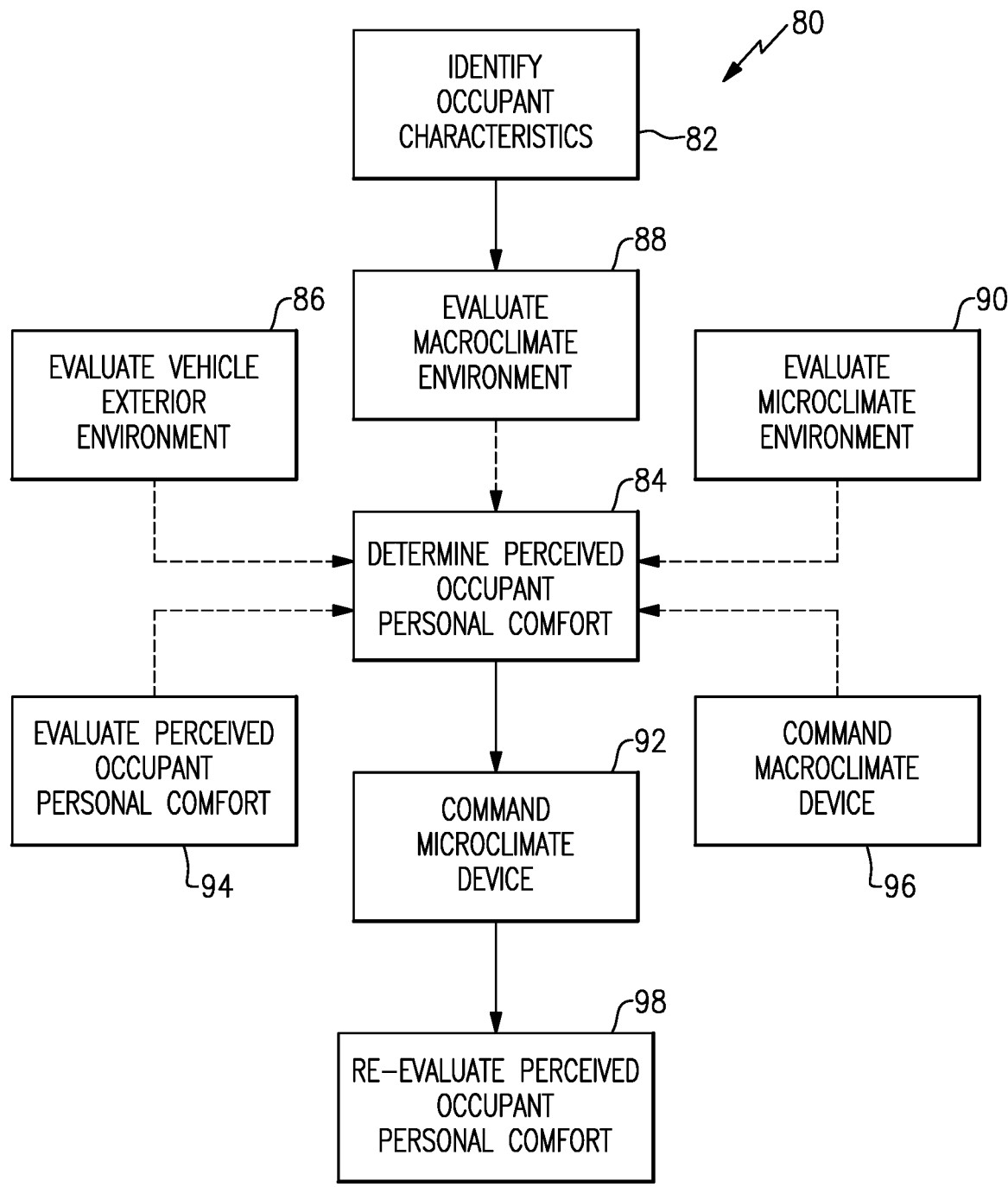
FIG. 4 is an example flow chart depicting microclimate system control methodology performed by the controller.

FIG. 4 illustrates an example control methodology of the microclimate system. In operation, the controller 22 includes a method 80 that identifies occupant characteristics, as indicated at block 82, such as the occupant information 32 (FIG. 2) to provide the user profile 31. This includes some level of occupant detection and personal identification, which can employ various vehicle systems. For example, many vehicles have "pre-sets" which identify the driver. Furthermore, weight sensors which detect the occupant's presence and can add another level of information used to identify the occupant. Interior visual systems (e.g., as a part of safety/airbag deployment, etc.) can greatly enhance the identification of a particular occupant. Bluetooth connected smartphones has also greatly simplified this task. Voice recognition or fingerprint identification may also be used. The presence of a particular device will provide driver (and in some cases passenger) identification with a high degree of certainty. This information can then be used to create the occupant's user profile 31 and the associated "thermal profile" data to produce the microclimate profile 33 used to implement the disclosed thermal management scheme. This information may then be stored on the phone or in the vehicle, allowing the transference of this information from one vehicle to another.

The controller 22 then determines occupant personal comfort, as indicated at block 84. The occupant personal comfort may be determined based upon evaluating the vehicle exterior environment (block 86; 26 in FIG. 2), evaluating the macroclimate environment (block 88; 28 in FIG. 2), and/or evaluating the microclimate environment (block 90; 30 in FIG. 2). Occupant personal comfort inputs may also be evaluated (block 94; 32 in FIG. 2), for example, by using an infrared camera (e.g., sensor 79 in FIG. 3) to detect a body temperature or other condition of the occupant.

Once the occupant personal comfort has been determined, a microclimate device is commanded according to the microclimate profile 33, as indicated at block 92, to achieve a desired occupant personal comfort. Additionally, a macroclimate device may also be commanded, as indicated at block 96, to further and more quickly achieve the desired occupant personal comfort. The occupant personal comfort may be reevaluated, as indicated at block 98, by adjusting the microclimate profile 33. This feedback may be provided by the occupant providing additional inputs via switches or other input devices, which indicates that the occupant is not yet comfortable, or by actively sensing the comfort of the occupant.

The controller 22 learns from the settings typically used by the occupant for a given set of conditions. The controller 22 also learns from adjustments to the settings during periods of automatic control when the microclimate system is operating according to an occupant's microclimate profile 33 associated with their user profile 31. The seat heater, for example, could be turned to "high" for a preset amount of time, and then backed down as the occupant becomes more comfortable and the HVAC system sufficiently regulates the macroclimate environment. For a more complex example, a seat neck warmer could be triggered in order to vasodilate blood flow to the hands while coordinating the conditioning of the steering wheel to achieve maximum thermal comfort perception on the part of the driver. When the vehicle learns what a particular occupant likes, based on their not adjusting the thermal management system during operation, those same conditions can be replicated the next time that they occur.

Additionally, microclimate devices, such as the seat surfaces may be heated or cooled so that the occupant is comfortable. In one example, in a particularly hot vehicle interior, it is not enough to simply provide cooled air flow to the vehicle cabin. Seats, particularly vinyl or leather seats, may be hot or uncomfortable to the touch causing the occupant's back to sweat initially even when entering a cooled vehicle cabin. Rapidly heating or cooling the seat depending upon the condition enhances occupant thermal comfort.

The more degrees of freedom present for control, the more responsive the microclimate system can become to the occupant. The addition of humidity sensors in strategic locations, or the use of low power IR sensors to sense skin temperature (or a combination of both) could be used to directly manipulate the perception of thermal comfort. Furthermore, coordination with the HVAC system allows the vehicle microclimate system to possess a feed forward component, enabling the microclimate system to achieve a smooth transition from the dynamic state or environment (seat thermal elements on full power, HVAC system on full power) to a desired static/homeostatic state or environment. The transition can simultaneously manage a temperature transition within the interior 12 and an occupant thermal comfort transition.

Figure 5:
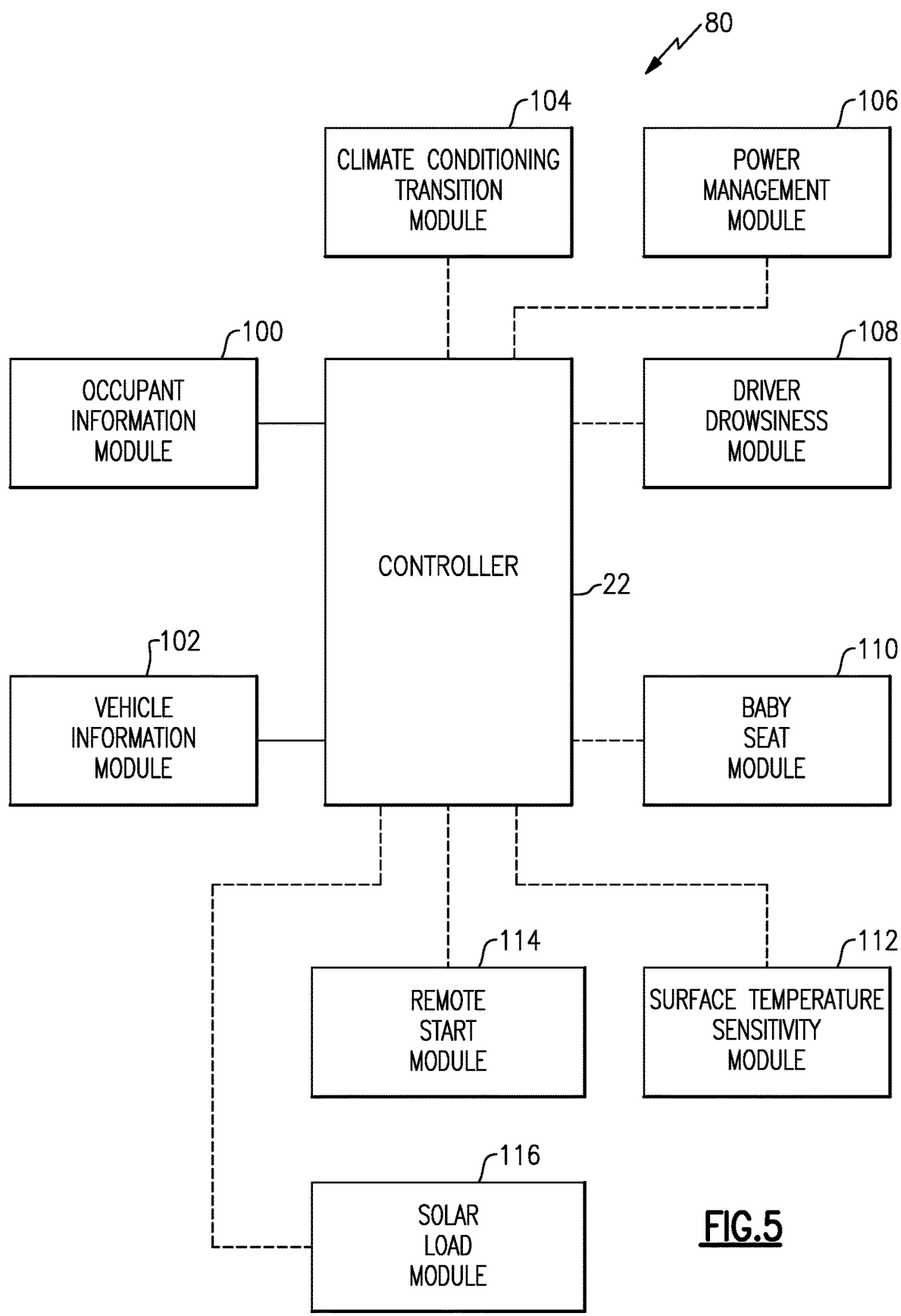
FIG. 5 is a schematic view of the controller and example vehicle climate control modules.

The disclosed microclimate system enables many unique thermal comfort situations to be addressed more effectively in a vehicle. Several examples are illustrated in FIG. 5. The method 80 includes a system in which an occupant information module 100 and a vehicle environment module 102 communicate with the controller 22, which generates occupant-specific microclimate profiles for use in setting the microclimate system at the occupant's specific location within the vehicle.

Figure 6:
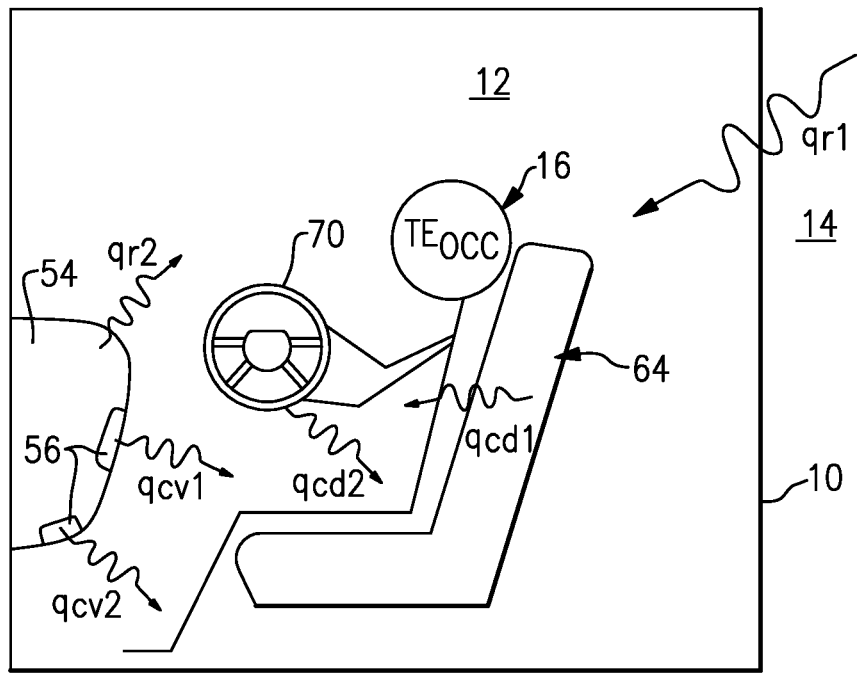
FIG. 6 is a schematic view of a thermal energy environment of the vehicle.
Figure 7:
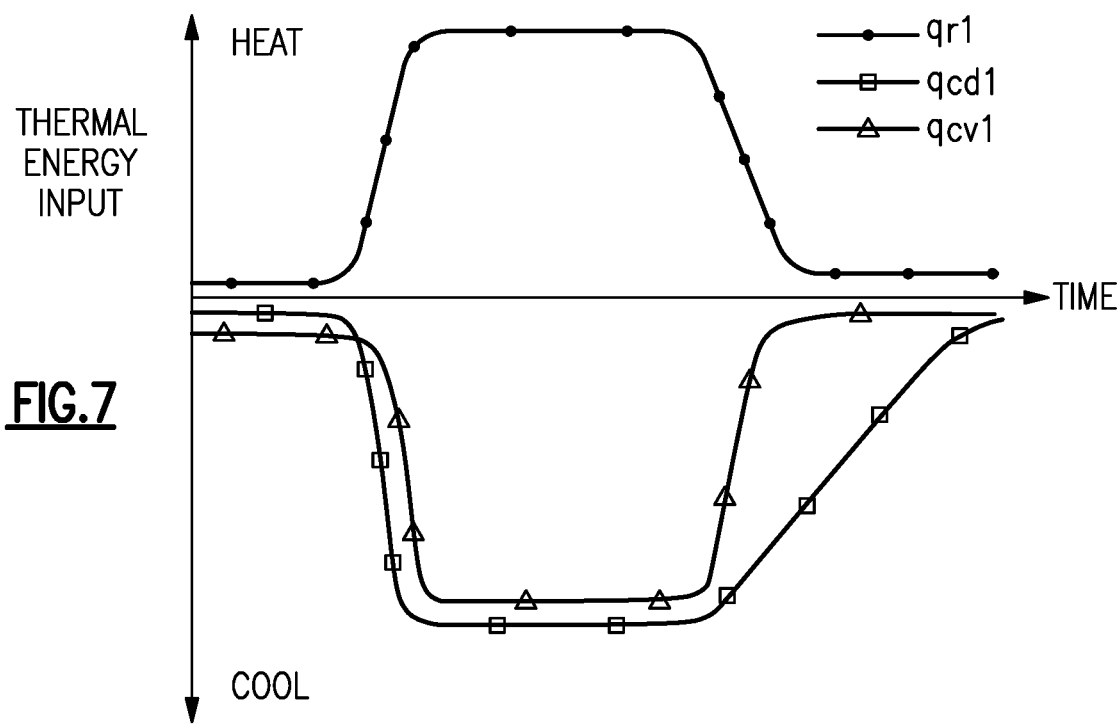
FIG. 7 is a graph depicting thermal energy inputs for various heating and/or cooling devices for the thermal energy environment of FIG. 6.

A climate conditioning transition module 104 includes algorithms that coordinate the operation of the HVAC thermal conditioning system 18 and the auxiliary thermal conditioning system 20 (examples of which are illustrated in FIGS. 6 and 7 and discussed in more detail below). The climate conditioning transition module 104 may include an input that has heating, cooling and neutral modes. In the heating mode, the occupant indicates that more heat is desired, and, in the cooling mode, the occupant indicates that more cooling is desired. In the heating and cooling modes, the auxiliary thermal conditioning system 20 can operate in a dynamic state to transition operation towards or to a desired static/homeostatic state. The heating and cooling modes may override the automatic control provided by the microclimate system. In the neutral mode, the occupant has indicated that the current thermal environment is comfortable to the occupant. In this mode, the climate conditioning transition module 104 automatically adjust the HVAC thermal conditioning system 18 and/or the auxiliary thermal conditioning system 20 to maintain this comfortable thermal state for the particular occupant. The controller 22 can adjust the occupant's microclimate profiles in memory based on adjustments by the occupant during operation in a neutral mode.

A power management module 106 minimizes the power used by the HVAC thermal conditioning system 18 and the auxiliary thermal conditioning system 20 as much as possible, for example. Power management control features reduce compressor and/or alternator load on the engine by simultaneously adjusting or reducing HVAC system operation while adjusting or increasing power to certain auxiliary thermal conditioning system devices.

A driver drowsiness module 108 may detect when a driver is drowsy and command the HVAC system and/or microclimate devices to maintain alertness of the driver, for example, by rapidly cooling the steering wheel or blowing cold air on the feet or face of the occupant.

A baby seat module 110 controls the HVAC thermal conditioning system 18 and the auxiliary thermal conditioning system 20 in the area of a baby seat, which is detected by a seatbelt sensor, occupant weight sensor or other input device.

A surface temperature sensitivity module 112 controls the microclimate devices, for example, a seat, for occupants who may have particular temperature sensitivity, such as paraplegics. This ensures that the surface temperatures are controlled based upon the particular needs and desires of the occupant. Using Bluetooth as an identifying occupant reference could facilitate the identification of an occupant who is paraplegic, which would allow the microclimate system to disable the seat heater option, if desired. This would require some form of self-identification on the part of the paraplegic.

A remote start module 114 may control microclimate devices in a remote start condition. By identifying the key fob which triggers the remote start, the microclimate system would be able to precondition the vehicle based on the temperature and humidity inside the cabin, the temperature and humidity outside of the cabin, as well as the history of the individual driver, including occupant identification and profile, time of day, microclimate system settings at end of last key cycle. The remote start module 114 quickly adjusts the microclimate based on the HVAC system operation and surrounding interior environment to converge on desired comfort and avoid "overshooting" desired microclimate to the occupant.

A solar load module 116 accounts for the sometimes significant comfort impact of the sun on the occupant within the vehicle. In some situations, a brightly shining sun on an occupant may cause the occupant to sweat even though the temperature and humidity within the cabin remains steady and was previously comfortable to the occupant. The solar load module 116 accounts for this condition, which is more fully illustrated in connection with the example in FIGS. 6 and 7, discussed below.

The vehicle 10 and its interior space 12 are schematically illustrated in FIG. 6. The vehicle 10 is arranged within the vehicle exterior environment 14. For illustrative purposes, the vehicle 10 includes the instrument panel 54 having vents 56, the seat 64 and the steering wheel 70. Of course, additional or different devices may be provided. The microclimate environment can be illustrated by the equations below.

$$TE_{occ} = \Sigma q_r + \Sigma q_{cv} + \Sigma q_{cd} \qquad \text{Equation 1}$$

$$TE_{occ} = q_{r1} + q_{r2} + q_{cv1} + q_{cv2} + q_{cd1} + q_{cd2} \qquad \text{Equation 2}$$

$$TE_{occ} = 1.2 q_{r1} + 0.8 q_{r2} + 1.8 q_{cv1} + 1.1 q_{cv2} + 2.0 q_{cd1} + 1.6 q_{cd2} \qquad \text{Equation 3}$$

Referring to Equation 1, $TE_{occ}$ is the thermal energy experienced by the occupant, $q_r$ corresponds to the thermal radiation sources, $q_{cv}$ corresponds to the thermal convection sources, and $q_{cd}$ corresponds to the thermal conduction sources. Multiple thermal inputs are provided in Equation 2 for illustrative purposes. More or fewer thermal inputs may be used by the microclimate control system. In one example set forth in Equation 3 and shown in FIG. 6, $q_{r1}$ is a solar radiation source, $q_{r2}$ is a heat load from components within the vehicle such as an instrument panel, $q_{cv1}$ is airflow from a first vent, $q_{cv2}$ is airflow from a second vent, $q_{cd1}$ is cooling from a seat back, and $q_{cd2}$ is cooling from a steering wheel.

In operation, the controller 22 determines a solar load on the vehicle interior space 12 based on, for example, vehicle location, vehicle direction of travel, detected light intensity and the sun location to determine the impact on occupant personal comfort. In one example, the controller 22 determines a volume of the microclimate affected by the solar load (microclimate affected volume), and compensates for the solar load by adjusting (represented by the coefficients in Equation 3) at least one device within the microclimate affected volume, an example of which is graphically shown in FIG. 7.

During vehicle operation the solar load $q_{r1}$ may increase, upsetting occupant personal comfort. In response, the controller 22 automatically commands the HVAC system to direct cool airflow $q_{cv1}$ through the vent 56 onto the occupant 16. The controller 22 also automatically commands the seat 64 to cool the back, $q_{cd1}$, of the occupant 16. The airflow from the vent 56 may be tapered off more quickly than the cooling from the seat 64, because the controller 22 may have learned that directing airflow onto the occupant 16 is perceived as bothersome by this particular occupant.

It should be noted that a controller 22 can be used to implement the various functionality disclosed in this application. The controller 22 may include one or more discrete units. Moreover, a portion of the controller 22 may be provided in the vehicle 10, while another portion of the controller 22 may be located elsewhere. In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller 22 may be a hardware device for executing software, particularly software stored in memory. The controller 22 can be a custom made or commercially available processor, a central processing unit (CPU), an auxiliary processor among several processors associated with the controller, a semiconductor-based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. The memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The disclosed input and output devices that may be coupled to system I/O interface(s) may include input devices, for example but not limited to, a keyboard, mouse, scanner, microphone, camera, mobile device, proximity device, etc. Further, the output devices, for example but not limited to, a printer, display, macroclimate device, microclimate device, etc. Finally, the input and output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the controller 22 is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A vehicle microclimate system comprising:
   a HVAC thermal conditioning system configured to provide a macroclimate environment;
   an auxiliary thermal conditioning system that has multiple microclimate devices, the microclimate devices configured to be arranged within an interior space that provides the macroclimate environment to an occupant, the microclimate devices are configured to provide a microclimate environment to the occupant different than the macroclimate environment, the microclimate devices configured to be in close proximity to a region of the occupant; and
   a controller in communication with the microclimate devices, the controller is configured to calculate an occupant personal comfort based upon a thermal energy experienced by the occupant from thermal radiation sources, thermal convection sources, and thermal conduction sources;
   wherein the controller configured to automatically command the microclimate devices in response to the calculated occupant personal comfort based upon occupant characteristics to achieve a desired occupant personal comfort;
   multiple thermal conditioning devices including the HVAC thermal conditioning system and the multiple microclimate devices; and
   wherein the automatic command from the controller is configured to control at least two of the multiple thermal conditioning devices that includes at least one of the multiple microclimate devices to adjust and apportion the thermal conduction sources and/or thermal radiation sources experienced by the occupant, to achieve the desired occupant personal comfort.

2. The vehicle microclimate system according to claim 1, wherein a region of the occupant includes at least one of a hand, a foot, a neck, a face, a leg, an arm, a head and a torso, and the at least one of multiple microclimate devices is provided by at least one of a steering wheel, a seat, a door panel, an armrest, a dash panel and a roof panel.

3. The vehicle microclimate system according to claim 1, wherein the occupant characteristics uses at least one of measured occupant information, user-input occupant information and learned occupant information.

4. The vehicle microclimate system according to claim 3, comprising an occupant comfort sensor in communication with the controller, the occupant comfort sensor configured to detect the occupant characteristics, the controller configured to use the detected occupant characteristics for determining the occupant personal comfort.

5. The vehicle microclimate system according to claim 4, wherein the occupant characteristics include at least one of occupant core temperature, occupant skin temperature and occupant skin moisture.

6. The vehicle microclimate system according to claim 5, wherein the occupant comfort sensor is an IR sensor configured to detect the occupant skin temperature.

7. The vehicle microclimate system according to claim 4, wherein the occupant comfort sensor is at least one of a weight sensor and a seatbelt sensor.

8. The vehicle microclimate system according to claim 3, wherein the user-input occupant information corresponds to a user-input occupant profile including at least one of gender, height, weight and occupant-provided comfort data.

9. The vehicle microclimate system according to claim 3, wherein the memory includes at least one look-up table with a microclimate profile associated with the occupant, the controller configured to modify the microclimate profile based upon at least one user input and command the microclimate devices in response to the microclimate profile associated with the user profile.

10. The vehicle microclimate system according to claim 9, wherein the controller records a thermal control setting for at least one of an outside temperature, an inside temperature, and a humidity on the look-up table and stores the thermal control settings chosen by the occupant under the recorded conditions.

11. The vehicle microclimate system according to claim 10, wherein the thermal control settings include user inputs to at least one of a switch and a touchscreen used to control at least one of the HVAC thermal conditioning system and the microclimate devices.

12. The vehicle microclimate system according to claim 3, wherein the occupant characteristics are associated with a microclimate profiles for use in setting the microclimate system at the occupant's specific location within the vehicle.

13. The vehicle microclimate system according to claim 1, wherein the occupant personal comfort is calculated based upon an equation $TE_{occ} = \Sigma q_r + \Sigma q_{cv} + \Sigma q_{cd}$, wherein $TE_{occ}$ is the thermal energy experienced by the occupant, $q_r$ corresponds to the thermal radiation sources, $q_{cv}$ corresponds to the thermal convection sources, and $q_{cd}$ corresponds to the thermal conduction sources, wherein the automatic command from the controller is configured to adjust $\Sigma q_{cd}$ and/or $\Sigma q_r$ by controlling at least one of multiple microclimate devices to achieve the desired thermal comfort according to the equation.

14. The vehicle microclimate system according to claim 13, wherein the controller is configured to detect a solar load on the vehicle relating to the thermal radiation sources $q_r$ based upon a solar load parameter, at least one of the microclimates device commanded in response the solar load parameter, the controller is configured to determine the solar load based upon at least one of vehicle location, vehicle direction of travel, detected light intensity and sun location.

15. The vehicle microclimate system according to claim 1, wherein the thermal convection source is thermally conditioned airflow from a vent.

16. The vehicle microclimate system according to claim 1, wherein the thermal conduction source is heating or cooling from a seat surface.

17. The vehicle microclimate system according to claim 1, wherein the occupant personal comfort is determined for each of multiple vehicle occupants.

18. A vehicle microclimate system comprising:
a HVAC thermal conditioning system configured to provide a macroclimate environment;
an auxiliary thermal conditioning system that has multiple microclimate devices, the microclimate devices configured to be arranged within an interior space that provides the macroclimate environment to an occupant, the microclimate devices are configured to provide a microclimate environment to the occupant different than the macroclimate environment, the microclimate devices configured to be in close proximity to a region of the occupant; and
a controller in communication with the microclimate devices, the controller is configured to calculate an occupant personal comfort based upon a thermal energy experienced by the occupant from thermal radiation sources, thermal convection sources, and thermal conduction sources;
wherein the controller configured to automatically command the microclimate devices in response to the calculated occupant personal comfort based upon occupant characteristics to achieve a desired occupant personal comfort;
wherein the automatic command from the controller is configured to control at least one of multiple microclimate devices to adjust and apportion the thermal conduction sources and/or thermal radiation sources experienced by the occupant, to achieve the desired occupant personal comfort; and
wherein the occupant characteristics uses user-input occupant information, the user-input occupant information corresponds to a user-input occupant profile including at least one of gender, height, weight and occupant-provided comfort data, wherein the user-input occupant profile is stored on at least one of a key fob and a mobile device.

19. The vehicle microclimate system according to claim 18, wherein the user-input occupant profile is configured to move with the occupant via a vehicle data link, a cloud, a wireless transmission and/or a smartphone for use with another vehicle.

20. A vehicle microclimate system comprising:
a HVAC thermal conditioning system configured to provide a macroclimate environment;
an auxiliary thermal conditioning system that has multiple microclimate devices, the microclimate devices configured to be arranged within an interior space that provides the macroclimate environment to an occupant, the microclimate devices are configured to provide a microclimate environment to the occupant different than the macroclimate environment, the microclimate devices configured to be in close proximity to a region of the occupant; and
a controller in communication with the microclimate devices, the controller is configured to calculate an occupant personal comfort based upon a thermal energy experienced by the occupant from thermal radiation sources, thermal convection sources, and thermal conduction sources;
wherein the controller configured to automatically command the microclimate devices in response to the calculated occupant personal comfort based upon occupant characteristics to achieve a desired occupant personal comfort;
wherein the automatic command from the controller is configured to control at least one of multiple microclimate devices to adjust and apportion the thermal conduction sources and/or thermal radiation sources experienced by the occupant, to achieve the desired occupant personal comfort; and wherein the controller records a thermal control setting for at least one of an outside temperature, an inside temperature, and a humidity on the look-up table and stores the thermal control settings chosen by the occupant under the recorded conditions, wherein the thermal control settings include user inputs to at least one of a switch and a touchscreen used to control at least one of the HVAC thermal conditioning system and the microclimate devices, wherein the thermal control settings are adjusted based upon how long the system is left in a particular state without the occupant adjusting the thermal control settings.

21. A vehicle microclimate system comprising:
a HVAC thermal conditioning system configured to provide a macroclimate environment;
an auxiliary thermal conditioning system that has multiple microclimate devices, the microclimate devices configured to be arranged within an interior space that provides the macroclimate environment to an occupant, the microclimate devices are configured to provide a microclimate environment to the occupant different than the macroclimate environment, the microclimate devices configured to be in close proximity to a region of the occupant; and
a controller in communication with the microclimate devices, the controller is configured to calculate an occupant personal comfort based upon a thermal energy experienced by the occupant from thermal radiation sources, thermal convection sources, and thermal conduction sources;
wherein the controller configured to automatically command the microclimate devices in response to the calculated occupant personal comfort based upon occupant characteristics to achieve a desired occupant personal comfort;
wherein the automatic command from the controller is configured to control at least one of multiple microclimate devices to adjust and apportion the thermal conduction sources and/or thermal radiation sources experienced by the occupant, to achieve the desired occupant personal comfort; and
wherein the memory includes at least one look-up table with a microclimate profile associated with the occupant, wherein the look-up table is configured to move with the occupant via a vehicle data link, a cloud, a wireless transmission and/or a smartphone for use with another vehicle.

* * * * *